(12) United States Patent
Toda et al.

(10) Patent No.: US 6,305,823 B1
(45) Date of Patent: Oct. 23, 2001

(54) AUTOMATIC LEVELING DEVICE FOR AUTOMOTIVE VEHICLE HEADLAMPS

(75) Inventors: Atsushi Toda; Hideaki Takeuchi, both of Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 0 days.

(21) Appl. No.: 09/417,782

(22) Filed: Oct. 14, 1999

(30) Foreign Application Priority Data

Oct. 14, 1998 (JP) .............................................. P.10-291891

(51) Int. Cl.[7] ...................................................... B60Q 10/76
(52) U.S. Cl. .......................... 362/276; 362/464; 362/465; 362/467
(58) Field of Search ..................................... 362/276, 464, 362/465, 467, 272, 286, 271

(56) References Cited

U.S. PATENT DOCUMENTS

| | | | |
|---|---|---|---|
| 3,177,355 | 4/1965 | Trowbridge | 362/467 |
| 3,385,961 | 5/1968 | Lemberger | 362/467 |
| 4,188,655 | 2/1980 | Tallon et al. | 362/549 |
| 4,845,598 | 7/1989 | Watanabe et al. | 362/515 |
| 5,195,816 | * 3/1993 | Moss, Jr. et al. | 362/460 |
| 5,787,370 | * 7/1998 | Kutscher et al. | 701/49 |
| 5,877,680 | * 3/1999 | Okuchi et al. | 340/468 |
| 6,109,759 | * 8/2000 | Tanabe et al. | 362/42 |

OTHER PUBLICATIONS

"HID System with Adaptive Vertical Aim Control", Society of Automotive Engineers, Inc. (1998) pp. (13–18).

* cited by examiner

Primary Examiner—Thomas M. Sember
Assistant Examiner—Ronald E. DelGizzi
(74) Attorney, Agent, or Firm—Fish & Richardson P.C.

(57) ABSTRACT

An automatic leveling device for automotive vehicle headlamps is described. The device automatically stops driving an actuator if the actuator is determined to be failing, while the other normally operating actuator is used to perform a leveling of the optical axis of the headlamp as close to a proper leveling as possible. In an implementation, a pair of left and right headlamps 1L, 1R have optical axes L that are tilted individually by driving left and right actuators 10L, 10R, respectively. A single control unit 16 simultaneously controls the driving of the left and right actuators 10L, 10R. A vehicle speed detection means 12, a pitch angle detection means 14, and failure detection means 20L, 20R are included. The control unit 16 controls the driving of the actuators 10L, 10R based on a detected pitch angle such that the optical axes of the headlamps stay in a certain inclined state with respect to the surface of a road, and when an actuator is determined to be failing, the CPU unit 16 stops driving the failing actuator, while driving the normally operating actuator, thereby performing a leveling of the optical axis of the headlamp as close to a proper leveling as possible.

9 Claims, 5 Drawing Sheets

AUTOMATIC LEVELING DEVICE FOR AUTOMOTIVE VEHICLE HEADLAMPS

BACKGROUND OF THE INVENTION

The present invention relates to an automatic leveling device for automotive vehicle headlamps for controlling the driving of optical axis tilt adjusting actuators based on an inclination in a longitudinal direction of a vehicle (hereinafter, referred to as a pitch angle). A pitch angle detection means detects and automatically tilt adjusts the optical axes of the headlamps (hereinafter, referred to as automatic leveling) in a direction to offset an angle corresponding to the detected pitch angle. In addition, the automatic leveling device includes a fail safe function that automatically stops driving the optical axis tilt adjusting actuators should they happen to fail.

Known automatically adjustable headlamps include a reflector having a light source securely inserted therein and supported in such a manner as to be tilted around a horizontal tilt shaft relative to a lamp body. The optical axis of the reflector (headlamp) is tiltable around the horizontal tilt shaft by means of an actuator. A conventional automatic leveling device includes a pitch angle detection means, a vehicle speed sensor, a controlling section for controlling the driving of an actuator based on signals from the detection means and sensor, and the like, all of which are mounted on a vehicle. The optical axes of the headlamps (reflectors) are adjusted so as to stay in a certain state with respect to the surface of the road at all times.

In the conventional automatic leveling device, however, no countermeasures are provided against a failure of the actuators. Thus, if the actuators fail and become inoperable, the optical axes of the headlamp are fixed in the position where they were directed when the actuators failed. If the optical axes are fixed as being directed more upwardly than a desirable level, although the driver of the subject vehicle can get good visibility, a driver of an oncoming vehicle will be dazzled by the light from the headlamps. Conversely, if the optical axes are fixed as being directed too low, although there is no problem for oncoming vehicles, the visible distance is shorter and may cause the driver to detect an object on the road too late, thus putting the driver into a dangerous situation.

SUMMARY OF THE INVENTION

The present invention provides an automatic leveling device for automotive vehicle headlamps, wherein if one of the actuators for automatically leveling the optical axes fails, the failing actuator is automatically stopped from being driven, while the actuator that is operating normally is used to restore as close to a proper leveling state as possible.

An automatic leveling device for automotive vehicle headlamps includes a pair of left and right headlamps whose optical axes are tilted individually vertically relative to a vehicle body through driving of left and right actuators, respectively. A single control unit simultaneously controls the driving of the left and right actuators. A vehicle speed detection means detects the speed of the vehicle, and a pitch angle detection means detects the pitch angle of the vehicle. The control unit controls the driving of the actuators based on a detected pitch angle such that the optical axes of the headlamps stay in a certain inclined state with respect to the surface of a road. A failure detection means is provided for each of the actuators that detect a failure thereof, whereby when a failure is detected in either of the actuators by the failure detection means, driving of only that failed actuator is stopped.

The optical axis of the headlamp having the failing actuator is fixed to a predetermined position, which is different from a desirably proper position because the driving control of the actuator is stopped. But since leveling of the other headlamp is properly performed, the degree of reduction in the visible distance for the driver is reduced, and glaring light directed at an oncoming vehicle is reduced.

The invention may include one or more of the following features. The automatic leveling device may include a control unit that determines, based on a signal from said failure detection means, whether or not the actuators fail, respectively, and wherein when determining that either of the actuators fails, the control unit outputs a driving stop signal to the failed actuator to stop driving the actuator. Since the control unit determines whether or not the actuators fail and stops driving the actuators, the number of constituent components of the automatic leveling device is reduced, and the construction thereof is simplified. The actuator may include a motor as an actuator main body, position detection means for detecting the driving magnitude of the motor, and a motor driver for feedback controlling the driving of the motor based on a signal from the position detection means. Since the motor driver built in the actuator feedback controls the motor, the quantity of information processed by the control unit is reduced. Therefore, the load on the control unit is reduced as well, whereby the number of functions demanded from the control unit is reduced.

The actuator may include a driving stop circuit for stopping driving of the motor, whereby when the failure detection means detects a failure in said actuator, the driving stop circuit is put into operation. When the motor is detected as failing by the failure detection means, the driving stop circuit is started to operate so as to stop the motor. In other words, the actuators themselves are provided with a fail safe function, and the number of functions required of the control unit is reduced accordingly.

Further, the automatic leveling device may include indicator means for informing the driver that either of the actuators is failing when the failure detection means so detects. The indicator means informs the driver that automatic leveling is not functioning properly.

A mode of operation of the invention will be described with reference to embodiments.

DETAILED DESCRIPTION

Figure 1:
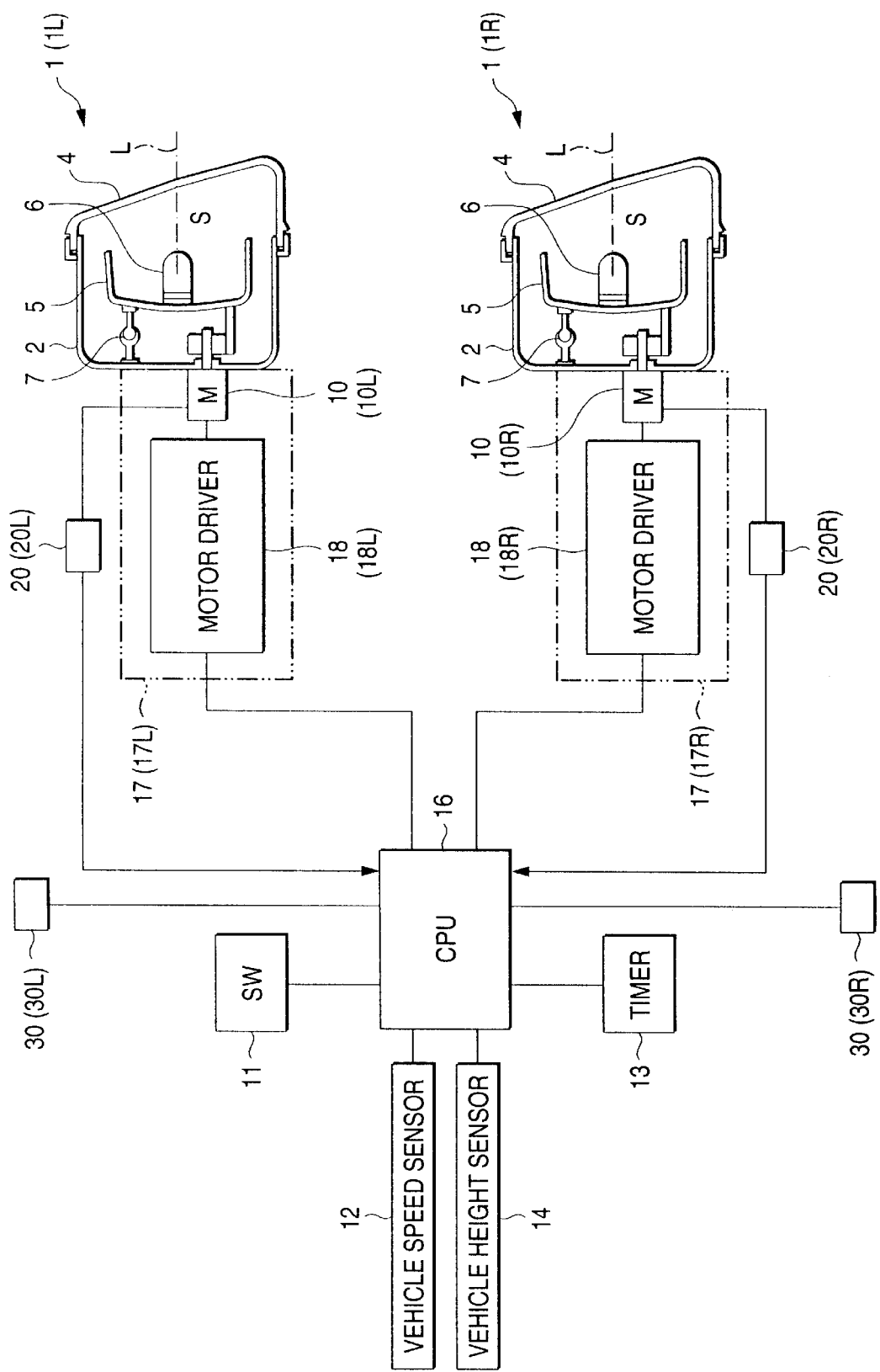
FIG. 1 illustrates an overall construction of an automatic leveling device for automotive vehicle headlamps according to a first embodiment of the present invention.

In FIG. 1, reference number 1 (1L, 1R) denotes a pair of left and right headlamps for an automotive vehicle, the headlights having the same construction. A front lens 4 is mounted in the front opening of a lamp body, so that a lamp space S is provided. In the lamp space S, a parabolic reflector 5 having a bulb 6 as a light source securely inserted therein is supported in such a manner as to be tilted around a horizontal tilt shaft 7 (in FIG. 1, a shaft normal relative to the surface of paper) and the parabolic reflectors 5 are then constructed so as to be tilt adjusted by actuators 17 (17L, 17R), respectively. The actuators 17 (17L, 17R) each comprise a stepping motor 10 (10L, 10R) which includes an actuator main body and a motor driver 18 (18L, 18R).

The headlamp automatic leveling device includes the actuators 17 (17L, 17R) for tilt adjusting respective optical axes L of the headlamps 1 (1L, 1R) vertically, actuator failure detection sensors 20 (20L, 20R), a headlamp switch-on switch 11, vehicle speed sensors 12 as a vehicle speed detection means for detecting the speed of a vehicle, vehicle height sensors 14 constituting a part of a vehicle pitch angle detection means, a CPU 16 as a control unit. The CPU 16 calculates vehicle speed depending on data from sensors 12 and calculates vehicle height depending on data from sensors 14, judges whether the headlamps are switched on or off, and output to motor drivers 18 (18L, 18R) a control signal for driving the motors 10 (10L, 10R) a magnitude corresponding to operating pitch angle data. A timer 13 is also connected to the CPU 16. Here, the CPU 16 includes a RAM which is a storage section for storing the operated vehicle pitch angle data or the like.

In addition, the CPU 16 determines whether or not the motors 10 (10L, 10R) are failing based on signals from the actuator failure detection sensors 20 (20L, 20R). When they are judged as failing, the CPU 16 then outputs a driving stop signal to the motor drivers 18 (18L, 18R) to stop driving the motors 10 (10L, 10R). The CPU 16 also functions to switch on warning lamps 30 (30L, 30R), which is an indicator means for optically indicating that the actuators fail.

When a signal is inputted into it from the vehicle speed sensor 12, the CPU 16 calculates a vehicle speed and an acceleration based on this inputted signal to thereby determine whether the vehicle is stopped or running. If it determines that the vehicle is running, the CPU 16 then determines whether or not the vehicle is run stably based on conditions inputted thereinto in advance.

When a signal is inputted into it from the vehicle height sensors 14, the CPU 16 calculates a vehicle inclination angle (pitch angle) in a longitudinal direction of the vehicle from the signal corresponding to a displacement distance of suspensions. When a two-sensor system is used in which vehicle height sensors are provided on both the front and rear wheels, the vehicle pitch angle is obtained from displacement distances of the vehicle height at the front and rear of the vehicle and a wheel base of the vehicle, or a distance between front and rear axles of the vehicle. Alternately, when a single sensor system is used in which sensors are provided on either the front wheels or the rear wheels, the pitch angle can be estimated from a displacement distance of the vehicle height. Then, the CPU 16 outputs a signal to the motor drivers 18 (18L, 18R) so as to tilt the optical axes L of the left and right headlamps 1 (1L, 1R) a predetermined distance in a direction to correct for the obtained or estimated pitch angle.

When the vehicle is stationary, since the proper pitch angle of the vehicle can be detected in principle, the driving of the motors 10 (10L, 10R) is first controlled based on the vehicle pitch angle obtained when the vehicle is at halt. In addition, when the CPU detects a signal from the vehicle height sensors 14, since there is no disturbance, the CPU 16 operates at a relatively fast sampling speed. But while the vehicle is running, in order to eliminate disturbance, the CPU 16 is constructed so as to calculate a pitch angle of the vehicle only on condition that the vehicle speed is equal to or higher than a reference value, the acceleration is equal to or lower than a reference value, and this state (in which the vehicle speed is equal to or higher than the reference value and the acceleration is equal to lower than the reference value) continues for a predetermined period of time or longer. For example, when a vehicle is running on a rough road in which disturbance is caused by irregularities on the road surface or the like, the vehicle cannot run at a speed of 30 km/h or higher, and in order to eliminate an abrupt acceleration causing the vehicle posture to be changed, it is proper to limit the acceleration to 0.5 m/s$^2$ or lower. Therefore, an abrupt detection of an abnormal value and any influence from the detection of an abnormal value are impeded by permitting calculation of a pitch angle of the vehicle to occur only on condition that the state in which the vehicle speed is equal to or higher than 30 km/h and the acceleration is equal to or lower than 0.5 m/s$^2$ continues for three seconds or longer. In addition, the CPU 16 determines whether the lighting switch is switched on or off, and it outputs a signal to the motor drivers 18 (18L, 18R) to drive the motors 10 (10L, 10R) only when the lighting switch is switched on.

The CPU 16 compares a signal from the actuator failure detection sensors 20 (20L, 20R) with conditions inputted in advance and determines whether or not the actuators are failing. When it determines that one of the actuators failed, the CPU 16 outputs a motor stop signal to the motor driver 18 so as not to drive the motor for the failed actuator, while it continues to control the driving of the actuator that is not detected as failing.

The actuator failure detection sensor 20 includes a motor lock detection means for detecting whether or not the motor is in a locked state because the driven portion of the reflector is frozen or because the driving of the motor is locked due to damage from an accident that caused a lock current to flow, whereby the motor is burned out. In addition, the actuator failure detection sensor 20 includes a power supply low voltage detection circuit for detecting the power supply voltage of the motor because a reduction in the power supply voltage of the motor may lower the torque of the motor, whereby a lock current is caused to flow. Furthermore, also included is a power supply high voltage detection circuit because a rise in the power supply voltage increases the coil current of the motor, which could cause the motor to burn out. Moreover, also included is a control unit-actuator in between the short-circuit detection means because if a short circuit occurs between the CPU 16 and the motor drivers an undesirable upward tilt of the optical axes of the headlamps may occur.

Figure 2:
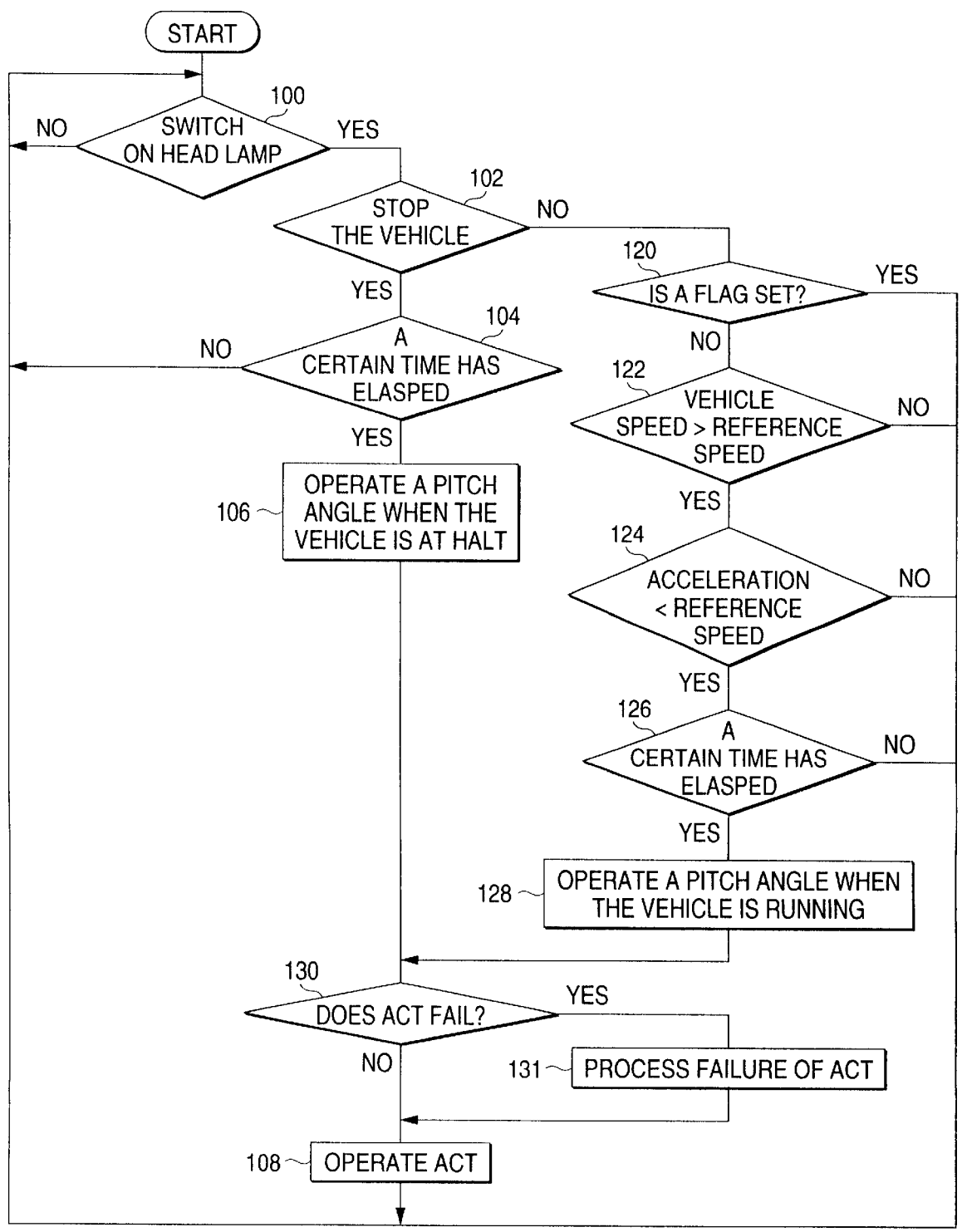
FIG. 2 illustrates a flow chart of a control unit of the automatic leveling device according to the invention.
Figure 3:
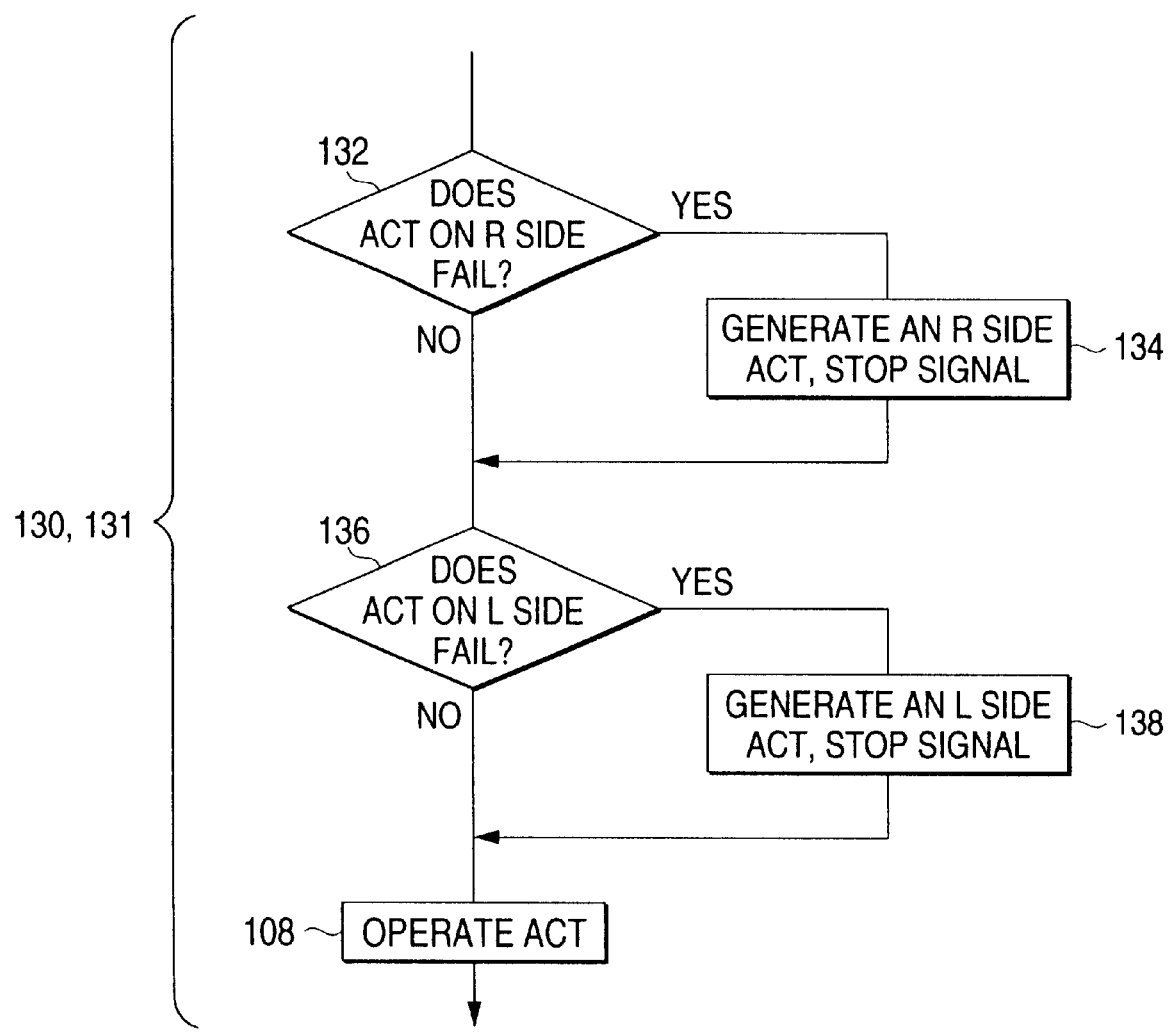
FIG. 3 is a detailed flowchart of an actuator failure detection control routine and an actuator failure processing routine of FIG. 2.

The flow charts of FIGS. 2 and 3 illustrate the control of the motors 10 by the CPU 16 as a control unit. In step 100 of FIG. 2, it is determined from a signal from the headlamp lighting switch 11 whether the headlamps are switched on or off. If NO (switched off), return to step 100; if YES, move to step 102. In step 102, it is determined from signals from the vehicle speed sensors 12 whether the vehicle is at halt or moving; if YES, in step 104, it is determined whether or not a predetermined time period, for instance 10 seconds has elapsed. If no, (if 10 seconds has not elapsed), the vehicle is regarded as being stopped, and move to step 106, where a pitch angle $\theta_1$ when the vehicle is at halt is calculated, and the calculated pitch angle is then stored in the RAM, which is a storage section. Then, move to step 108 via an actuator failure judgment control step 130 (actuator failure processing step 131).

In the actuator failure judgment control step 130, as will be described later, the control unit 16 determines based on signals from the actuator failure detection sensors 20 (20L, 20R) whether or not there is a failure of driving of the motors 10 (10L, 10R). If no failure is detected, move to step 108 where the control unit 16 outputs signals to the motor drivers 18 (18L, 18R) so as to drive the motors 10 (10L, 10R) a magnitude corresponding to the pitch angle $θ_1$ when the vehicle is at halt, and then return to step 100. This simultaneously levels the left and right headlamps 1 (1L, 1R).

However, in step 130, if a failure is determined as occurring, move to the actuator failure processing step, where the control unit 16 outputs a signal to the motor driver 18 to stop driving the motor 10 judged as failing (the motor 10 is prevented from being driven) and switches on the warning lamp 30, thereafter moving to step 108. Due to this processing, the motor driver 18 cannot drive the failing motor 10, and hence the headlamp whose motor is failing cannot be leveled. In addition, the driver can confirm from the warning lamp 30 that the automatic leveling device is out of order.

In step 102, if No (the vehicle is running), move to step 120, where it is determined whether or not a flag is set. In other words, in step 108, if a leveling has already been performed based on the pitch angle at the time of stable running, a flag has been set, but in step 120, if No (it is determined that the flag is not set, that is the motors have not yet been driven based on the pitch angle at the time of stable running), move to step 122, and it is determined whether or not the vehicle speed exceeds the reference value (30 Km/h). If YES (the vehicle speed exceeds 30 km/h), in step 124, it is determined whether or not the acceleration is lower than the reference value when the vehicle is at halt. In step 124, if YES (lower than 0.5 m/s$^2$), then in step 126 it is determined whether or not a state continues for a predetermined time period (three seconds) or longer in which the vehicle speed exceeds 30 km/h and the acceleration is lower than 0.5 m/s$^2$. In step 126, if YES (if such a state is determined as continuing three seconds or longer) move to step 128, where a pitch angle $θ_2$ at the time of stable running is calculated, and an operated pitch angle $θ_2$ is stored in the RAM which is a storage section. Next, move to step 108 via the actuator failure judgment control step 130 (actuator failure processing step 131).

As previously described about the actuator failure judgment control step 130, the control unit 16 determines whether or not there exists a failure of driving of the motors 10 (10L, 10R) based on the signals from the actuator failure detection sensors 18 (18L, 18R). If no failure is determined as existing, then move to step 108, and the control unit 16 outputs signals to the motor drivers 18 (18L, 18R) so as to drive the motors a magnitude corresponding to the pitch angle $θ_2$ at the time of stable running and sets a flag, then returning to step 100. This simultaneously levels the left and right headlamps.

The vehicle posture at the time of stable running is substantially identical to that when the vehicle is at a halt, and it is easily detected. Moreover, since the pitch angle $θ_2$ of the former is substantially identical to that $θ_1$ of the latter, even if the driving of the actuators (motors 10) are controlled based on the pitch angle $θ_2$ at the time of stable running, no problem will be caused. In particular, as to the pitch angle of $θ_1$ when the vehicle is at a halt, an erroneous pitch angle would be detected when the vehicle rides on the curb, but the pitch angle $θ_1$ when the vehicle is stationary is corrected by the pitch angle $θ_2$ at the time of stable running (the driving of the actuators is controlled based on the pitch angle $θ_2$ at the time of stable running) while running, whereby a leveling of the optical axes based on the erroneous pitch angle when the vehicle is at a halt is avoided.

In step 130, if a failure is determined to exist, then move to the actuator failure processing step 131, where the control unit 16 outputs a stop signal to the motor driver 18 so as to make it stop driving the failing motor 10 (the motor 10 is prevented from being driven) and switches On the warning lamp 30, thereafter moving to step 108. Due to this processing, the motor driver 18 is not permitted to drive the failing motor, and hence the optical axis of the headlamp having the failing motor is not leveled.

In addition, in step 120, if YES (if a flag is set, in step 108, as in the case where a leveling is performed based on the pitch angle $θ_2$ at the time of running, if the pitch angle is corrected while running), and for the cases in steps 122, 124, and 126, are NO, respectively, (in cases, respectively, where the vehicle speed is equal to or lower than the reference value of 30 km/h, the acceleration is equal to or higher than the reference value of 0.5 m/s$^2$, and such a state does not continue for three seconds or longer), in any case, then return to step 100 without controlling the driving of the motor 10.

Referring to FIG. 3, a detailed flowchart of the actuator failure determination control step 130 and the actuator failure processing step 131 will be described. In the case where the stepping motor 10 (10L, 10R), which is the actuator main body, fails, the driving of the actuator is stopped.

First, in step 132, a signal from the actuator failure detection sensor 20R is compared with an allowable value set in advance, and from this it is determined whether or not the leveling motor 10R of the right-hand side headlamp 1R fails. If NO (no failure), move to step 136, where a signal from the actuator failure detection sensor 18L is compared with an allowable value set in advance, and from this it is determined whether or not the leveling motor 10L of the left-hand side headlamp 10L fails. If NO (no failure) then move to step 108, where the control circuit 16 outputs signals to the motor drivers 18R, 18L so as to control the motors 10R, 10L based on the pitch angle $θ_1$ when the vehicle is at a halt calculated in step 106 and stored in the RAM (or the pitch angle $θ_2$ at the time of stable running operated in step 128 and stored in the RAM), then returning to step 100. Thus, in a case where neither of the leveling motors 10L, 10R of the left and right headlamps is failing, the left and right headlamps are simultaneously leveled. In addition, in a case where the driving of the motors 10L, 10R is controlled based on the pitch angle $θ_2$ at the time of stable running, as is previously described, a flag is set.

Conversely, in step 132, if YES (the right leveling motor is determined to be failing), in step 134, a stop signal is outputted to the motor driver 18R of the right-hand side headlamp, and the warning lamp 30R is switched on. Next, in step 136, if YES (the left leveling motor is determined to be failing), then in step 138, a stop signal is outputted to the motor driver 18L of the left-hand side headlamp, and the warning lamp 30L is switched on. Then, in step 108, since motor driving stop signals from the control circuit 16 outputs are output to the motor drivers 18L, 18R, the motors 10L, 10R are not driven and hence neither of the left and right headlamps are leveled, and the optical axes of the respective headlamps are left in a fixed state.

In addition, if YES (the right leveling motor is determined to be failing) in step 132, while NO (no failure is determined) in step 136, the CPU 16 outputs a stop signal to the motor driver 18R of the right-hand side headlamp and switches on the warning lamp 30R. Therefore, in step 108, the optical axis of the left-hand side headlamp 1L is properly leveled, but no leveling is performed with respect to the right-hand side headlamp 1R, and hence the optical axis thereof is fixed.

However, if NO (no failure is determined) in step 132, while YES (the left leveling motor is determined to be failing) in step 136, then in step 138 the CPU 16 outputs a stop signal to the motor driver 18L of the left-hand side headlamp 1L and switches on the warning lamp 30L. Therefore, in step 108 the right-hand side headlamp 1R is properly leveled, but no leveling is carried out with respect to the left-hand side headlamp 1L, and the optical axis thereof is fixed.

In addition, if the failure is eliminated after the leveling of the affected headlamp is stopped, then move to step 108 via steps 132, 136, where both the headlamps are properly leveled, and therefore no safety problem is caused.

Thus, in this embodiment, if the stepping motor 10 (10L, 10R), which is the actuator main body, fails, only the failing motor is stopped. The properly operating motor continues to be driven and controlled. Due to this, the headlamp having the failing motor is not leveled and the optical axis thereof is fixed at a predetermined position. But since the headlamp having the properly operating motor is properly leveled, the driver does not have to experience a too-short visible distance and no excessive glaring light is directed at an oncoming vehicle, thus the running safety of both of the vehicles is secured.

Figure 4:
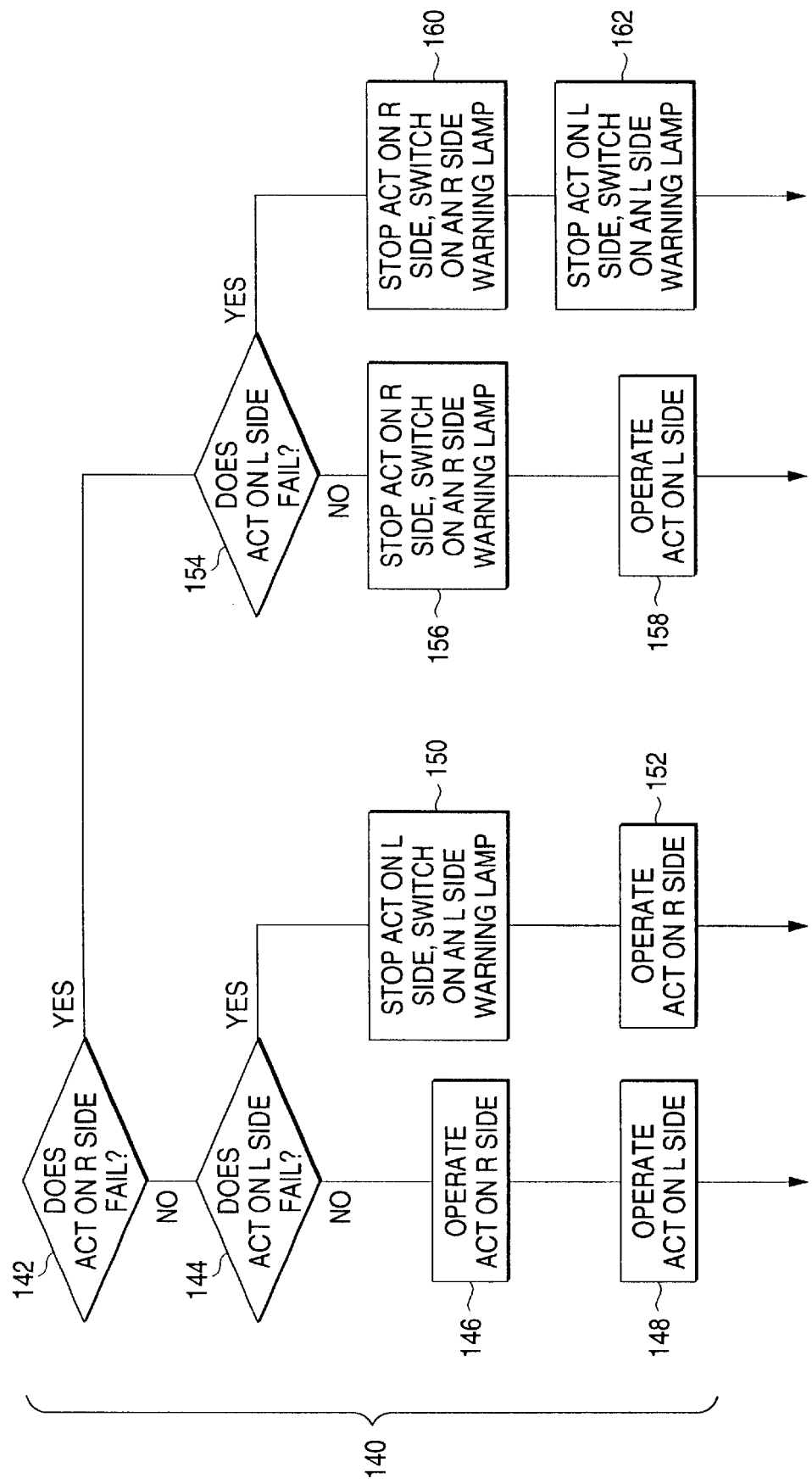
FIG. 4 is a flowchart of control unit (CPU) processing as a main part of an automatic leveling device for automotive vehicle headlamps according to a second embodiment of the present invention.

The process flow (shown in FIG. 3) from the actuator failure determination control step 130 (actuator failure processing step 131) to the actuator driving step 108 may be constituted by a process flow chart 140 shown in FIG. 4. In particular, in this implementation, instep 142, it is determined based on a signal from the actuator failure detection sensor 20R whether or not the leveling motor 10R of the right-hand side headlamp 1R fails. If NO (no failure is determined), move to step 144 where it is determined based on a signal from the actuator failure detection sensor 20L whether or not the leveling motor 10L of the left-hand side headlamp 1L fails. If NO (no failure is determined) then in steps 146, 148, signals are outputted to the motor drivers 18R, 18L so as to control the motors 10R, 10L based on the pitch angle $\theta_1$ (or pitch angle $\theta_2$), then returning to step 100.

Conversely, if YES (the leveling motor 10L for the left-hand side headlamp fails) in step 144, then in step 150, a stop signal is outputted to the motor driver 18L of the left-hand side headlamp and the warning lamp 30L is switched on. Then in step 152 a signal is outputted to the motor driver 18R so as to control the motor 10R of the right-hand side headlamp 1R based on the pitch angle $\theta_1$ (or pitch angle $\theta_2$), then moving back to step 100. However, if YES (the leveling motor 10R of the right-hand side headlamp 1R is failing) in step 142, then in step 154 it is determined from a signal from the actuator failure detection sensor 18L whether or not the leveling motor 10L of the left-hand side headlamp 1L fails. If NO (no failure is determined), move to step 156, and a stop signal is outputted to the leveling motor 10R of the right-hand side headlamp 1R, and the warning lamp 30R for the right-hand side headlamp is switched on. Next, instep 158 a signal is outputted to the motor driver 18L so as to control the motor 10L based on the pitch angle $\theta_1$, (or pitch angle $\theta_2$), then moving back to step 100. If YES (the leveling motor 10L of the left-hand side head lamp 1L fails) in step 154, then in steps 160, 162, stop signals are outputted to the motor drivers 18L, 18R of the left and right headlamps, respectively, and the warning lamps 30L, 30R for the left and right headlamps are switched on, the returning to step 100. The remaining portions of this embodiment are the same as those of the first embodiment, and hence a repeated description is omitted.

Figure 5:
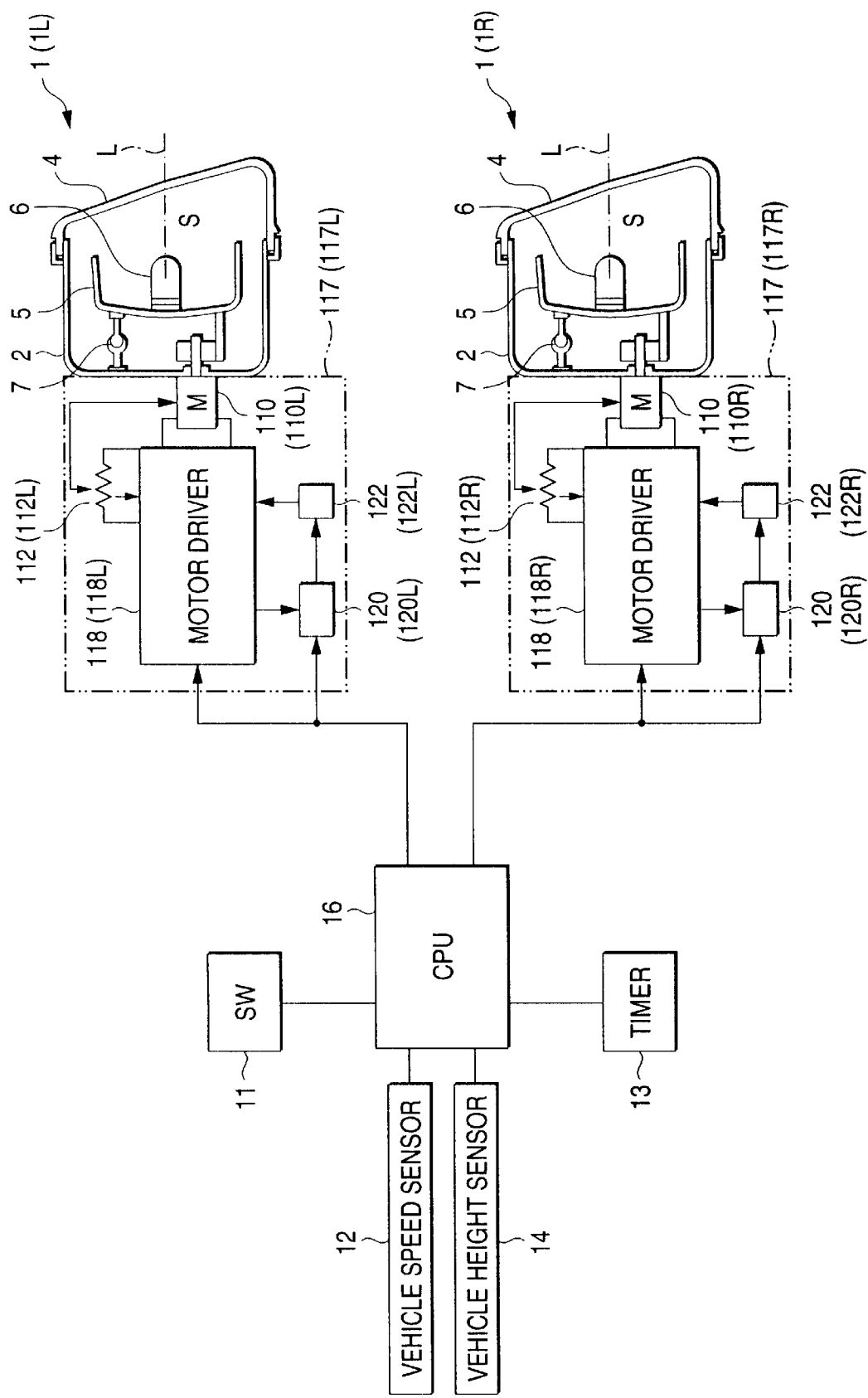
FIG. 5 illustrates an alternate embodiment of an automatic leveling device for automotive vehicle headlamps according to the invention.

FIG. 5 is a drawing showing an overall construction of a third embodiment of the present invention. In the third embodiment, actuators 117 (117L, 117R) comprise DC motors 110 (110L, 110R) and motor drivers 118 (118L, 118R) for controlling the driving of the motors 110 (110L, 110R). The motor drivers 118 (118L, 118R) are constructed so as to feedback control the DC motors 110 (110L, 110R) such that positional data from the potentiometers 112 (112L, 112R), which are position detection means, approximates pitch angle data input from the CPU 16 based on the positional data from the potentiometers 112 (112L, 112R). In addition, actuator failure detection circuits 120 (120L, 120R) provided for the actuators 117 (117L, 117R) determine whether or not the DC motors 110 (110L, 110R) are operating normally based on data on motor current, potential-voltage, pitch angle data, power supply voltage or the like inputted from the motor drivers 118 (118L, 118R). If they judge that a DC motor is failing, then an output stop circuit 122 (122L, 122R) is put in operation such that a motor driving stop signal is output to the failing motor driver 112 (112L, 112R). Consequently, the control unit 16 of FIG. 5 does not have to be provided with the motor failure determination function of the CPU 16 described in the first and second embodiments, and the fewer functions required of the control unit, the lower its price becomes. In addition, since there are not many signals sent from the CPU 16 to the actuators 117 (117L, 117R), the number of wire harnesses therebetween may be reduced.

In the above embodiments, as conditions for detecting a pitch angle at the time of stable running, the vehicle sped of 30 km/h or higher, acceleration of 0.5 m/s$^2$ or lower and continuation of such a state for three seconds or longer are required. But those figures are so stated only for the purpose of illustration and therefore the present invention is not limited to those figures. Moreover, in the above embodiments, the warning lamp 30 is illustrated as indication means for informing a driver that an actuator has failed, but an audio device such as a buzzer may be used. In addition, in the above embodiments, the automatic leveling of the optical axes of the reflector movable type headlamps is described in which the reflector 5 is tilted relative to the lamp body 2 which is fixed to the vehicle body. But the present invention may be similarly applied to a case in which the optical axes of a unit type headlamps are automatically leveled in which a lamp body/reflector unit is provided so as to be tilted relative to a lamp housing which is fixed to the vehicle body.

As is clear from the above descriptions, the automotive vehicle headlamp automatic leveling device provides a certain degree of visible distance for the driver of the subject vehicle, while producing no excessive glaring light to a driver of an oncoming vehicle, whereby the running safety can be secured. The construction of the automatic leveling system may be simplified, to facilitate the installation of the system on an automotive vehicle. In another implementation, the motors are feedback controlled by the actuators, and therefore an open-loop control will be sufficient for controlling the actuators by the control unit. As a result, a lower-priced control unit may be used for the control unit. Moreover, the number of harnesses between the control unit and the actuators may be reduced, which contributes to providing the automatic leveling system as a whole at a low price. In another implementation, the actuator itself is provided with the fail safe function, thus a control unit having less functions may be used. In addition, since the driver can recognize without any delay from the indicator means that the automatic leveling device for the headlamps has failed, required countermeasures can be taken by him/her, whereby the running safety can further be secured.

What is claimed is:

1. An automatic leveling device for automotive vehicle headlamps comprising:

a pair of left and right headlamps whose optical axes are tilted individually vertically relative to a vehicle body through driving of left and right actuators, respectively;

a single control unit for simultaneously controlling the driving of said left and right actuators;

vehicle speed detection means for detecting the speed of a vehicle; and pitch angle detection means for detecting the pitch angle of said vehicle;

said control unit controlling the driving of said actuators based on a detected pitch angle and detected vehicle speed such that the optical axes of said headlamps stay in a certain inclined state with respect to the surface of a road; wherein failure detection means is provided for each of said actuators for detecting a failure thereof, whereby when either of said actuators is detected as failing by said failure detection means, driving of only said failing actuator is stopped.

2. An automatic leveling device for automotive vehicle headlamps as set forth in claim 1, wherein said control unit judges, based on a signal from said failure detection means, whether or not either of said actuators fail, respectively; and wherein when judging that either of said actuators fail, said control unit outputs a driving stop signal to said actuator which is detected as failing so as to stop driving said actuator.

3. An automatic leveling device for automotive vehicle headlamps as set forth in claim 1, wherein at least one of said actuators comprises:

a motor as an actuator main body, position detection means for detecting the driving, magnitude of said motor, and a motor driver for feedback controlling the driving of said motor based on a signal from said position detection means.

4. An automatic leveling device for automotive vehicle headlamps as set forth in claim 3, wherein each of said actuators has provided therein a driving stop circuit for stopping driving of said motor, whereby when said failure detection means detects a failure in an actuator, said driving stop circuit is put into operation.

5. An automatic leveling device for automotive vehicle headlamps as set forth in claim 1, wherein said automatic leveling device has provided therein indicator means for informing the driver that either of said actuators is failing when said failure detection means so detects.

6. A method for individually leveling automotive headlamps of a vehicle comprising:

detecting the speed of the vehicle;

detecting a pitch angle of the vehicle;

controlling the driving of a left actuator to tilt a left headlamp depending on the pitch angle;

controlling the driving of a right actuator to tilt a right headlamp depending on the pitch angle;

detecting a failure of either of the left and the right actuator; and terminating the driving of the failed actuator.

7. The method of claim 6, further comprising activating an indicator means if an actuator fails.

8. The method of claim 6, further comprising activating a driving stop circuit when an actuator fails to stop the driving of the actuator.

9. The method of claim 6, wherein a control circuit determines if an actuator is failing based on a signal from a failure detection means and produces a stop driving signal to stop driving the failing actuator.

* * * * *